(12) United States Patent
Wortman et al.

(10) Patent No.: US 8,949,493 B1
(45) Date of Patent: Feb. 3, 2015

(54) CONFIGURABLE MULTI-LANE SCRAMBLER FOR FLEXIBLE PROTOCOL SUPPORT

(75) Inventors: Curt Wortman, Milpitas, CA (US); Chong H. Lee, San Ramon, CA (US); Huy Ngo, San Jose, CA (US)

(73) Assignee: Altera Corporation, San Jose, CA (US)

( * ) Notice: Subject to any disclaimer, the term of this patent is extended or adjusted under 35 U.S.C. 154(b) by 1223 days.

(21) Appl. No.: 12/847,761

(22) Filed: Jul. 30, 2010

(51) Int. Cl.
*G06F 3/00* (2006.01)
*G06F 13/00* (2006.01)
*G06F 5/00* (2006.01)
*G06F 13/12* (2006.01)
*G06M 3/00* (2006.01)
*G11C 19/00* (2006.01)
*G01R 31/28* (2006.01)
*G06F 17/50* (2006.01)
*G06F 1/02* (2006.01)
*G06F 7/58* (2006.01)
*H04L 9/00* (2006.01)

(52) U.S. Cl.
USPC .......... 710/65; 710/11; 710/14; 710/33; 710/38; 377/26; 377/70; 377/75; 714/726; 714/729; 703/15; 708/252; 708/253; 708/256; 380/265

(58) Field of Classification Search
USPC ............ 710/11, 14, 65–66; 377/26, 70, 75; 714/726, 729, 781; 703/15; 708/252–253, 256; 380/46, 265
See application file for complete search history.

(56) References Cited

U.S. PATENT DOCUMENTS

| 4,713,605 | A | * | 12/1987 | Iyer et al. ............... 324/73.1 |
| 4,852,023 | A | * | 7/1989 | Lee et al. ............... 708/253 |
| 5,105,376 | A | * | 4/1992 | Pedron .................. 708/252 |
| 5,946,473 | A | * | 8/1999 | Lotspiech et al. ......... 703/15 |
| 5,991,909 | A | * | 11/1999 | Rajski et al. ............ 714/729 |
| 6,014,446 | A | * | 1/2000 | Finkelstein ............. 380/46 |
| 6,040,725 | A | * | 3/2000 | Lee et al. ............... 327/175 |
| 6,061,417 | A | * | 5/2000 | Kelem ................... 377/26 |
| 6,181,164 | B1 | * | 1/2001 | Miller ................... 326/46 |
| 6,320,872 | B1 | * | 11/2001 | Asbjorn et al. ........... 370/466 |

(Continued)

OTHER PUBLICATIONS

U.S. Appl. No. 12/288,178, filed Oct. 17, 2008, Vijayaraghavan et al.

(Continued)

*Primary Examiner* — Farley Abad
*Assistant Examiner* — Henry Yu
(74) *Attorney, Agent, or Firm* — Mauriel Kapouytian Woods LLP; Michael Mauriel; Andrew A. Noble (57) ABSTRACT

Various structures and methods are disclosed related to configurable scrambling circuitry. Embodiments can be configured to support one of a plurality of protocols. Some embodiments relate to a configurable multilane scrambler that can be adapted either to combine scrambling circuits across a plurality of lanes or to provide independent lane-based scramblers. Some embodiments are configurable to select a scrambler type. Some embodiments are configurable to adapt to one of a plurality of protocol-specific scrambling polynomials. Some embodiments relate to selecting between least significant bit ("LSB") and most significant bit ("MSB") ordering of data. In some embodiments, scrambler circuits in each lane are adapted to handle data that is more than one bit wide.

20 Claims, 10 Drawing Sheets (56) References Cited

U.S. PATENT DOCUMENTS

| | | | |
|---|---|---|---|
| 6,442,579 B1* | 8/2002 | Hansson | 708/252 |
| 6,560,338 B1* | 5/2003 | Rose et al. | 380/47 |
| 6,738,939 B2* | 5/2004 | Udawatta et al. | 714/726 |
| 7,286,589 B1* | 10/2007 | Toussi et al. | 375/130 |
| 7,487,194 B2* | 2/2009 | Lablans | 708/492 |
| 2003/0103628 A1* | 6/2003 | Luc et al. | 380/265 |
| 2006/0039558 A1* | 2/2006 | Morii et al. | 380/46 |
| 2007/0283231 A1* | 12/2007 | Hoyle | 714/781 |
| 2008/0244274 A1* | 10/2008 | Lablans | 713/189 |
| 2009/0083833 A1* | 3/2009 | Ziola et al. | 726/2 |
| 2009/0327382 A1* | 12/2009 | Hisakado | 708/252 |
| 2012/0030450 A1* | 2/2012 | Yu | 712/220 |

OTHER PUBLICATIONS

U.S. Appl. No. 12/752,641, filed Apr. 1, 2010, Vijayaraghavan et al.

"IEEE Standard for Information technology," IEEE 802.3-2008, Section 4, pp. 474, 475 and 478.

"Interlaken Protocol Definition," A Joint Specification of Cortina Systems and Cisco Systems, Revision 1.2, Oct. 7, 2008, pp. 30-31 and 48-50.

"Synchronous Optical Network (SONET) Transport Systems: CommonGeneric Criteria," GR-253-CORE Issue 3, Sep. 2000, Telcordia Technologies, pp. 5-6 and 5-7.

"Base Specification Revision 3.0," PCI Express®, Nov. 10, 2010, pp. 213-217.

* cited by examiner

FIG. 10

CONFIGURABLE MULTI-LANE SCRAMBLER FOR FLEXIBLE PROTOCOL SUPPORT

BACKGROUND

This invention relates generally to the area of system interconnect technology.

As CPU speeds have reached the multi-gigahertz range, system designers increasingly focus on system interconnect as the primary bottleneck at the chip-to-chip, board-to-board, backplane and box-to-box levels. System interconnect has evolved from utilizing parallel I/O technology with source-synchronous clocking or system-synchronous clocking to multi-gigabit serial I/O with clock-data recovery ("CDR"). Channel aggregation bonds individual serial I/O lanes to create a multi-lane link, transcending the bandwidth limitations of single transceiver channels and providing the high bandwidth required by next generation serial protocols such as 40/100 Gigabit Ethernet and PCI Express Gen 3. However, various communication protocols have different functional requirements. At the same time, there is an increasing need for system designers to have flexibility in designing systems to work with one particular protocol versus another.

Scrambling/descrambling processing stages in a high speed transceiver allow high speed signals to have sufficient transition densities to help minimize data errors. Scrambling is typically carried out by linear feedback shift register ("LFSR") circuits including shift register elements and one or more XOR circuits. However, different protocols have different scrambling techniques. For example, some protocols use multiplicative scrambling while others use additive scrambling. As another example, different protocols use different scrambling polynomials, each of which require different couplings to XOR circuits in an LFSR. Also, in some protocols lanes are aggregated and data across multiple lanes is preferably scrambled together. As another example, some protocols use a least significant bit ("LSB") ordering of data while others use a most significant bit ("MSB") ordering.

There is a need for integrated circuits ("ICs") with transceivers that can be adapted for use with different protocols. However, it may be cumbersome/costly to provide completely separate scrambling circuitry for each possible protocol for which the IC might be utilized. Therefore, there is a need for scrambling circuitry that can be adapted for different protocols.

SUMMARY

An embodiment of the invention provides scrambling circuitry configurable to support one of a plurality of scrambling protocols. In one embodiment, scrambling circuitry includes scrambling circuits in each of a plurality of data lanes and the scrambling circuitry is configurable such that scrambling circuits in a plurality of data lanes are combined to provide a multilane scrambler or such that scrambling circuits in each lane operate independently. In one embodiment, a scrambling circuit is configurable to be adapted for operation as one of a plurality of scrambler types (for example, either additive or multiplicative). In one embodiment, a scrambling circuit is configurable to support scrambling in accordance with any one of a plurality of scrambling polynomials. In one embodiment, a scrambling circuit results from a method of streamlining the number of XOR circuits (and, in some embodiments, the number of programmable taps coupling shift register element outputs to the XOR circuits) needed to support one of a plurality of scrambling polynomials. In a particular embodiment, LSFR circuits in each lane are adapted to scramble multi-bit wide data. In one embodiment, selection circuitry coupled to a multi-lane scrambler is configurable to provide either least significant bit ("LSB") or most significant bit ("MSB") data ordering from a first to a last lane of a plurality of lanes. In one embodiment, selection circuitry coupled to a scrambling circuit for a particular lane processing multi-bit wide data is configurable to provide either LSB or MSB data ordering within a particular lane.

BRIEF DESCRIPTION OF THE DRAWINGS

For purposes of illustration only, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the invention is not intended to be limited to the embodiments shown, but is to be accorded the widest scope consistent with the principles and features disclosed herein.

Figure 1:
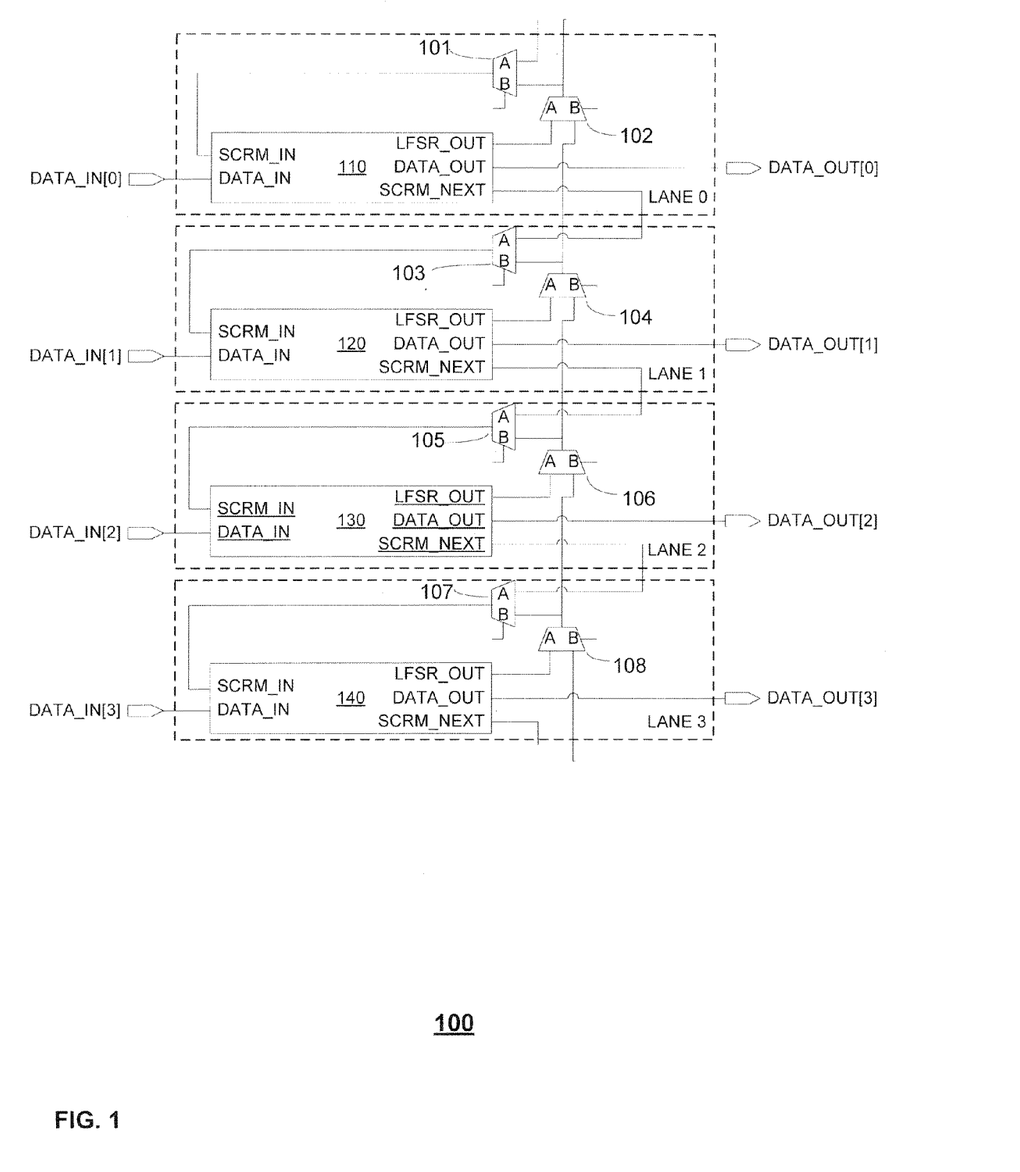
FIG. 1 illustrates a configurable multilane scrambler in accordance with an embodiment of the invention.

FIG. 1 illustrates a configurable multilane scrambler 100 in accordance with an embodiment of the invention. Scrambler 100 includes linear feedback shift register ("LFSR") circuits 110, 120, 130, and 140 associated with respective data lanes LANE 0, LANE 1, LANE 2, and LANE 3. Scrambler 100 further includes a plurality of selection circuits coupled between the LFSR circuits. The selection circuits illustrated in FIG. 1 include a plurality of output selection circuits including multiplexers ("muxes") 102, 104, 106, and 108 and feedback muxes 101, 103, 105, and 107. The terms "output" and "feedback" in the context of these selection circuits are merely labels to help identify the selection circuits in the context of this description; those terms are not in and of themselves intended to impart any narrower meaning. Other labels are used herein for similar purposes, for example, simply to name different outputs and inputs or label different circuits of the same basic type (e.g. selection circuits, XOR circuits, etc.); as those skilled in the art will appreciate, such terms should in many instances be read merely as labels.

Scrambling circuits 110, 120, 130 and 140 have respective inputs for receiving respective input data signals DATA_IN [0], DATA_IN[1], DATA_IN[2], and DATA_IN[3]. Scrambling circuits 110, 120, 130 and 140 also each include inputs labeled "SCRM_IN" and outputs labeled "LFSR_OUT," "DATA_OUT" and "SCRM_NEXT." In some implementations, each of these signals, for example, DATA_IN[1], is one bit wide. However, in other implementations, the scrambling circuits may include circuitry adapted to receive parallel data in each lane that is more than one bit wide (sometimes referenced herein as "multi-bit" wide) as will be more fully described in the context of FIGS. 7-8.

Continuing with the description of FIG. 1, scrambler 100 can be configured such that scrambling circuits 110, 120, 130, and 140 each scramble data independently on a lane-by-lane basis. For example, if output muxes 102, 104, 106, and 108 are each configured to select their "A" inputs and feedback muxes 101, 103, 105, and 107 are each configured to select their "B" inputs, then each of LFSR circuits 110, 120, 130, and 140 will be configured to operate independently and operate only on data for a corresponding lane. However, one or more of the LFSR circuits of scrambler 100 can be combined to work together such that data across multiple lanes is scrambled together. For example, to combine (or "cascade") the four illustrated LFSR circuits (110, 120, 130, and 140) to scramble data together across all four illustrated lanes, output mux 108 would be configured to select its A input while output muxes 102, 104, and 106 would be configured to select their B inputs. Also, feedback mux 101 would be configured to select its B input while feedback muxes 103, 105, and 107 would be configured to select their A inputs. In this manner, output from LFSR circuits 120, 130, and 140 is provided to the scrambling input SCRM_IN of LFSR circuit 110; also output from SCRM_NEXT of LFSR 110 is provided to scramble input SCRM_IN of LFSR 120, output from SCRM_NEXT of LFSR 120 is provided to scramble input SCRM_IN of LFSR 130, and output from SCRM_NEXT of LFSR 130 is provided to scramble input SCRM_IN of LFSR 140.

Figure 2:
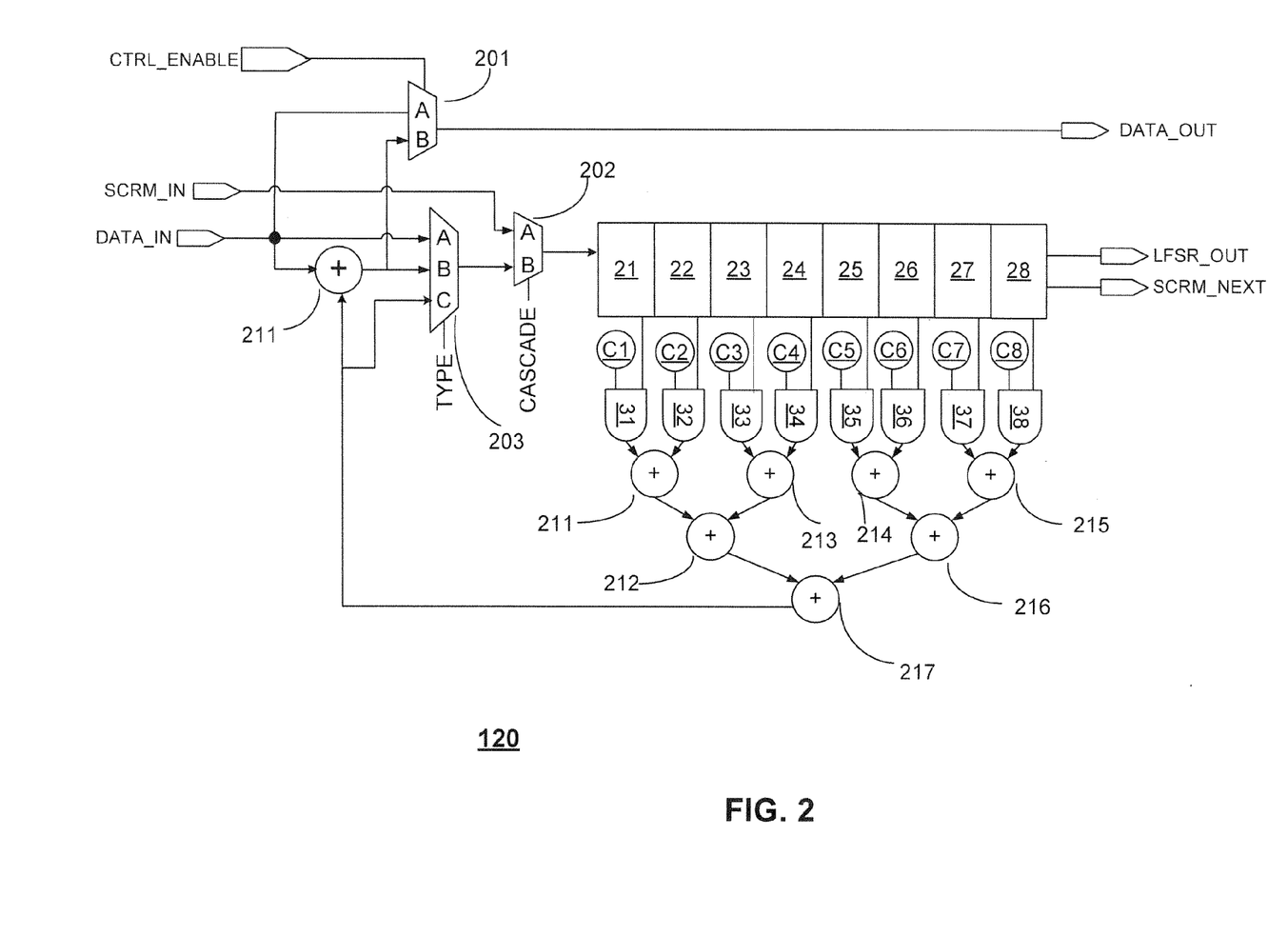
FIG. 2 illustrates further details of one of the configurable linear feedback shift register ("LFSR") circuits of the embodiment of FIG. 1.

FIG. 2 illustrates further details of an exemplary LFSR circuit, LFSR circuit 120, of FIG. 1. LFSR 120 includes a series of shift register elements 21, 22, 23, 24, 25, 26, 27, and 28. As those skilled in the art will appreciate, these elements may be implemented by various well know register circuits such as, for example, flip-flops. The "D", Q" "clock" and other inputs of these elements are well known but not separately shown to avoid complicating the drawings. However, those skilled in the art will appreciated that in a typical implementation, the data output "Q" of a first shift register element (e.g. element 24) will be coupled to a data input "D" of a next shift register element (e.g. element 25). Further details of the individual shift register elements and associated selection circuitry are described in the context of FIG. 5. Continuing with the description of FIG. 2, in this example, first inputs of respective AND gates 31, 32, 33, 34, 35, 36, and 37 are coupled to respective outputs of the shift register elements as shown. Second inputs of respective AND gates are coupled, respectively, to configuration elements C1, C2, C3, C4, C5, C6, C7 and C8 as shown. The outputs of the AND gates are coupled to a feedback XOR circuit tree including feedback XOR circuits 212, 213, 214, 215, 216, and 217. As illustrated, the output of XOR circuit 217 provides one of the inputs to input XOR circuit 211 and is also coupled to the C input of mux 203 as shown. The AND gates together with the configuration elements effective provide programmable taps from the shifter register elements to the feedback XOR circuit tree. This allows the LFSR to be configured for different polynomials (as will be further explained with specific examples below). If the configuration element coupled to an AND gate input is set to "1" (logical high), then the other input of the AND gate will pass output from a shift register element to the XOR tree. On the other hand, if that configuration element is set to "0," then the corresponding shift register element output is not provided to the XOR tree.

As illustrated in FIG. 2, the incoming data signal DATA_IN is provided to an input of XOR circuit 211, to the A input of mux 201, and to the A input of mux 203. Scrambling input signal "SCRM_IN" is provided to the A input of mux 202.

The selection circuits 201, 202, and 203 allow various configuration options for LFSR circuit 120. If mux 201 is configured to select its A input, then LFSR circuit 120 is effectively bypassed. This may be desirable if, for example, the IC transceiver that includes the LFSR circuit is to be configured for use with a protocol that does not require data scrambling. Furthermore, even if scrambling is utilized by a particular protocol, different protocols may require that the scrambling occur in a different order relative to other processing. Therefore, in a particular transceiver, two scrambling blocks may be provided along a data path, but only one utilized depending upon which protocol is utilized. Therefore, mux 201 provides the ability for the particular scrambling block of which LFSR 120 is a part to be selectively bypassed in the data path. Mux 202 is configured to select its A input if the scrambler is in cascade mode (as described in the context of FIG. 1). However, assuming the scrambler is not operating in cascade mode, then mux 202 is configured to select its B input. The B input is coupled to receive the output of mux 203. Mux 203 allows configuration of the "type" of scrambler circuit that LFSR circuit 120 will be adapted to operate as. Specifically, when LFSR circuit 120 is to be utilized as a multiplicative scrambler, then mux 203 is configured to select its B input. When LFSR circuit 120 is to be utilized as a multiplicative descrambler, then mux 203 is configured to select its A input. When LFSR circuit 120 is to be utilized as an additive scrambler or descrambler, then mux 203 is configured to select its C input. Those skilled in the art will appreciated that in one embodiment selection circuits such as selection circuits 201, 202, and 203 can be configured by loading data at power up into configuration elements (such as, for example, random access memory elements) coupled to the control input of these multiplexers (such configuration elements not separately shown). However, the implementation of such configuration elements can vary widely. In some examples, fuse, anti-fuse, or other elements that are "one time" programmable may be used so that data does not have to be loaded into the element each time the device is powered up. The type of programmable element utilized may vary by application as will be appreciated one skilled in the art. In some alternative examples, the control of such muxes may be accomplished by signals provided "on the fly" by on chip processing logic (e.g. a state machine) that provides the necessary control signal during operation of the IC of which the scrambler is a part. Such an "on the fly" control signal implementation might be appropriate in some instance in which the value of the control signal might need to change after device initialization.

Different protocols utilize different scrambling polynomials. Different polynomials require different shift register element outputs to be tapped to feed back into one or more XOR circuits. By programming configuration elements C1, C2, C3, C4, C5, C6, C7, and C8, various scrambling polynomials may be supported. As a simplified example, if the scrambling polynomial is of the form $x^5+x^3+1$, then C1, C2, C4, C6, C7, and C8 are programmed with "0" (logical low) and C3 and C5 are programmed with "1" (logical high). The effect of such a configuration is that the outputs shift register elements 23 and 25 are XOR'ed together by XOR circuit 217.

As another simplified example, if the scrambling polynomial is of the form $x^8+x^6+x^2+1$, then C2, C6, and C8 are configured with a 1 and C1, C3, C4, C5, and C7 are configured with a 0. The effect of such a configuration is that the outputs of shift register elements 26 and 28 are XOR'ed together by feedback XOR circuit 216 and the result is XOR'ed together with the output of shift register element 22 by feedback XOR circuit 217.

Those skilled in the art will appreciate that in actual implementations, scrambling polynomials often utilized terms with much larger exponents that the simplified examples referenced above. An LFSR circuit that implements such scrambling function would be larger than LFSR circuit 120 illustrated in FIG. 2. The illustration of FIG. 2 is merely for purposes of illustrating the underlying principles of an embodiment of the invention. As examples of some presently defined high speed communication protocols: The SONET/SDH protocol utilizes the polynomial $x^{43}+1$. The Ethernet/Interlaken protocol utilizes the polynomial $x^{58}+x^{39}+1$. The PCI Express Gen. 3.0 protocol uses the polynomial $x^{23}+x^{21}+x^{18}+x^{15}+x^7+x^2+1$. Therefore, LFSR circuits need to be of significantly greater length than that illustrated in FIG. 2. For example, to support any one of the three above-mentioned protocols, the number of shift register elements needed in a multi-protocol LFSR circuit is given by the highest exponent of any term in any of the possible scrambling polynomials that need to potentially be supported. In this case, 58 shift register elements would be needed. If all the possible exponent values up to 58 were covered by the feedback XOR circuit tree tapping off from the shift register elements, the XOR circuit tree would be very large. However, given that protocols which a configurable IC transceiver would likely need to support are limited and not likely to have every exponent value between the smallest and largest exponent across the various protocol-specific polynomials, it is possible and desirable to provide a streamlined arrangement of feedback XOR circuits that minimizes the circuitry needed to support the various protocols. A simplified example is illustrated in FIG. 3.

Figure 3:
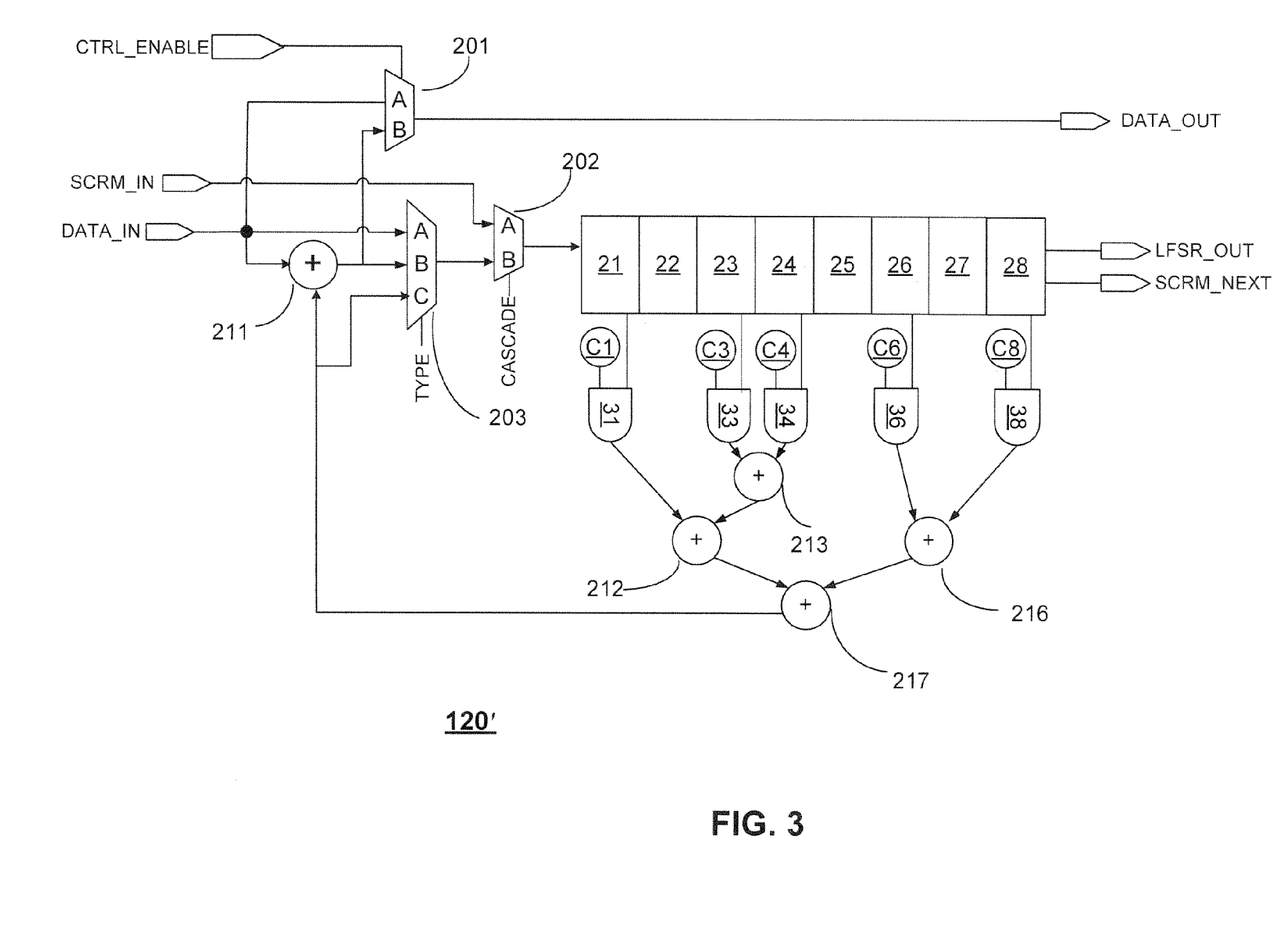
FIG. 3 illustrates an alternative embodiment of the LFSR circuit illustrated in FIG. 2. This alternative embodiment illustrates an LFSR circuit streamlined in accordance with an aspect of an embodiment of the invention.

FIG. 3 illustrates an LFSR circuit 120' that is a streamlined version of LFSR circuit 120 illustrated in FIG. 2. The example of FIG. 3 assumes that the supported protocols only have polynomial terms with exponents equaling 1, 3, 4, 6, or 8. Therefore, the full arrangement of XOR circuits illustrated in FIG. 2 is not necessary. As illustrated in FIG. 3, only register elements 21, 23, 24, 26, and 28 need to be coupled to feedback XOR circuitry through a respective AND gate. Furthermore, only four feedback XOR circuits, circuits 212, 213, 216, and 217 are required in a XOR circuit tree (for purposes of simplifying the description, these XOR circuits, which XOR together outputs of shift register elements, are referenced as part of a feedback "XOR tree" while input XOR circuit 211, which XORs together the result of the feedback XOR tree with input data is referenced separately). The illustrated arrangement can supported a plurality of scrambling polynomials. For example, to support a polynomial of the form $x^8+x^4+x+1$, configuration bits C1, C4, and C8 would be set to 1 and C3 and C6 would be set to 0. The effect of such a configuration is that the outputs of shift register elements 21 and 24 are XOR'ed together by XOR circuit 212 and the result is XOR'ed together with the output of shift register element 28 by XOR circuit 217. As another example to support a polynomial of the form $x^6+x^3+1$, configuration bits C3 and C6 would be set to 1 and C1, C4, and C8 would be set to zero. The effect of such a configuration is that the outputs of shift register elements 23 and 26 are XOR'ed together by XOR circuit 217.

Figure 4:
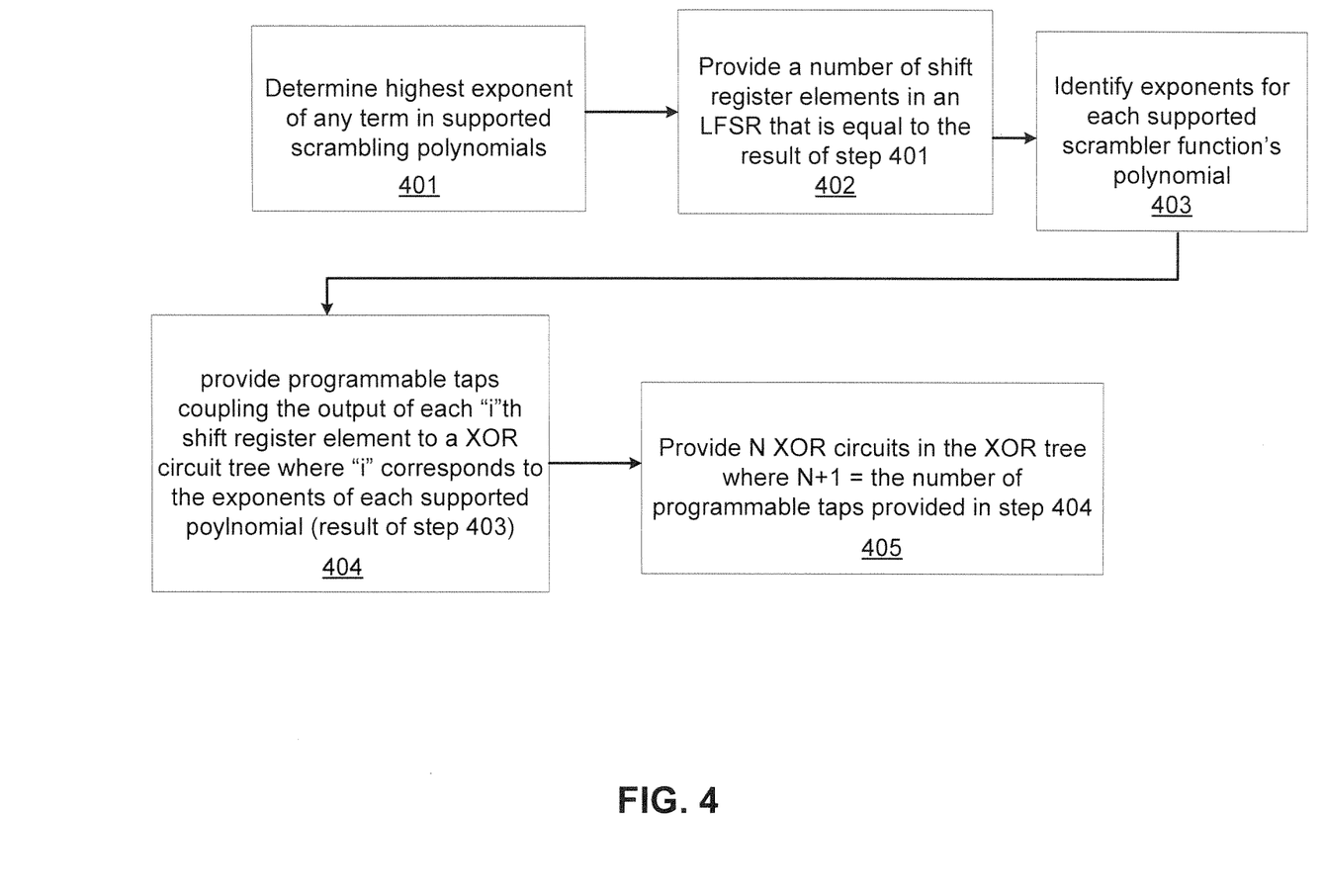
FIG. 4 illustrates a method for providing a streamlined scrambler that can support scrambling for any one of a plurality of different scrambling polynomial functions. The illustrated method is in accordance with an embodiment of one aspect of the invention.

FIG. 4 illustrates a method 400 for providing a streamlined scrambler that can support scrambling for any one of a plurality of different scrambling polynomial functions. Step 401 determines the largest exponent of a term across any of the plurality of polynomials. Step 402 provides a number of shift register elements that is equal to the result of step 401. For example, if the highest exponent of any term is 58, then 58 shift register elements would be provided. Step 403 identifies the value of non-zero exponents for each term in the supported polynomials. Step 404 provides programmable taps coupled to the output of each shift register element in the chain of shift register elements that corresponds to the result of step 403. For example, if various terms of supported polynomials have exponents including 5, 21, 30, and 58, then the $5^{th}$, $21^{st}$, $30^{th}$, and $58^{th}$, shift register elements in the shift register would have their outputs configurably coupled (e.g. via programmable taps) to a XOR circuit tree. Under step 405, the number of XOR circuits provided in the XOR circuit tree is N where N+1 is the number of shift register elements with programmable taps as determined in step 403. In the example of the $5^{th}$, $21^{st}$, $30^{th}$, and $58^{th}$ shift register elements having programmable taps to the XOR circuit tree and the XOR circuit tree would include four XOR circuits.

As stated above, the SONET/SDH protocol utilizes the polynomial $x^{43}+1$; the Ethernet/Interlaken protocol utilizes the polynomial $x^{58}+x^{39}+1$; the PCI Express Gen. 3.0 protocol uses the polynomial $x^{23}+x^{21}+x^{18}+x^{15}+x^7+x^2+1$. To build a configurable scrambler to support these protocols applying method 400 (and following the principles of the example of FIG. 3), an LFSR with 58 shift register elements would be provided. Programmable AND gate taps would be provided coupling the outputs of the $2^{nd}$, $7^{th}$, $15^{th}$, $18^{th}$, $21^{st}$, $23^{rd}$, $39^{th}$, $43^{rd}$, and $58^{th}$ shift register elements to a XOR circuit tree. The feedback XOR circuit tree would have eight XOR circuits and would be coupled to an input XOR circuit. To configure such a circuit to support one of these protocols, one would follow the principles of the example described in the context of FIGS. 2 and 3. Specifically, for the SONET/SDH protocol, the programmable AND gate coupled to the output of the $43^{rd}$ shift register element would be set to "1" and the remaining AND gate programmable inputs would be set to "0." For the Ethernet Interlaken Protocol, the programmable AND gates coupled to the outputs of, respectively, the $39th^{rd}$ and $58^{th}$ shift register elements would be set to "1" and the remaining AND gate programmable inputs would be set to "0." For the PCI Express Gen. 3 protocol, the programmable AND gates coupled to the outputs of, respectively, the $2^{nd}$, $7^{th}$, $15^{th}$, $18^{th}$, $21^{st}$, and $23^{rd}$ shift register elements would be set to "1" and the remaining AND gate programmable inputs would be set to "0."

Figure 5:
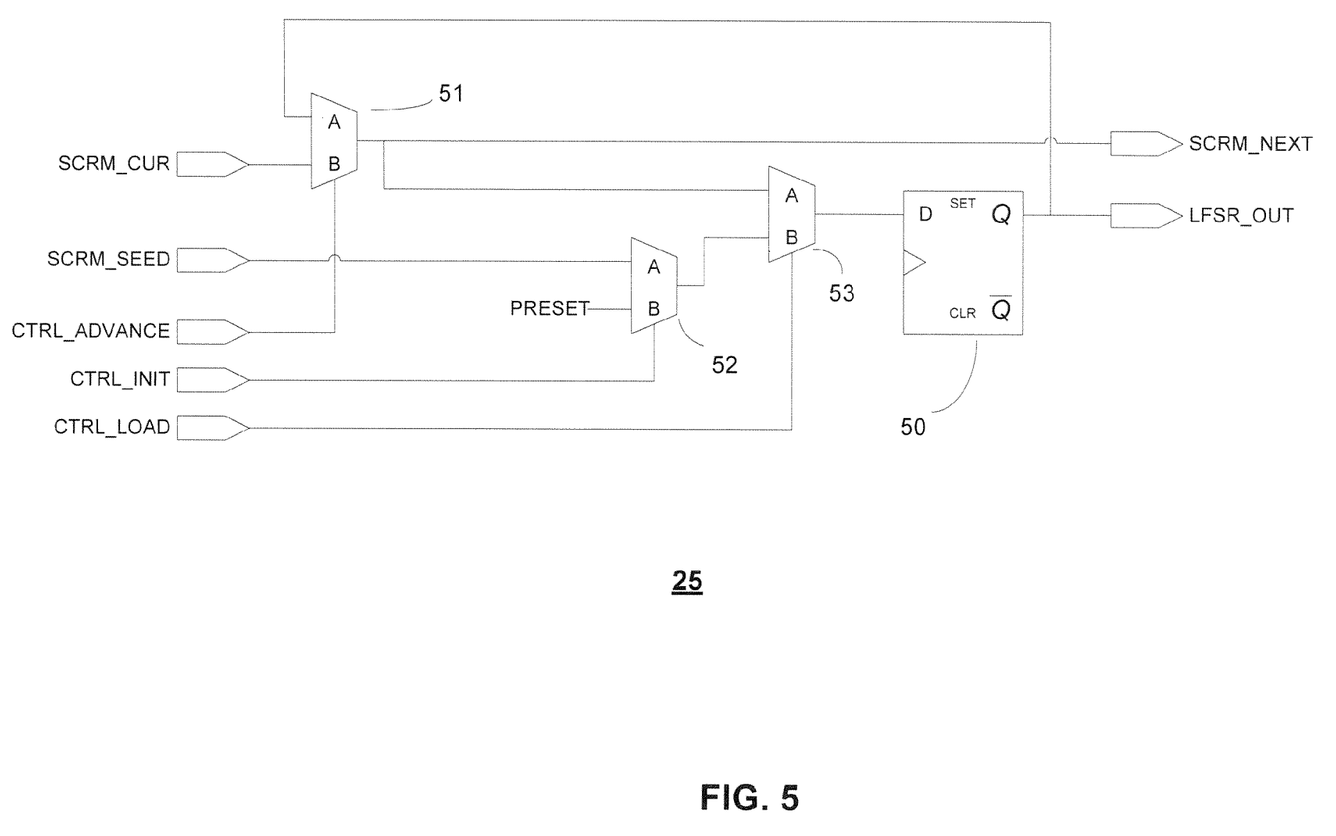
FIG. 5 illustrates a configurable individual shift register element of the LFSR circuit illustrated FIG. 2.

FIG. 5 illustrates an exemplary shift register element, shift register element 25 of LFSR circuit 120 of FIG. 2. This shows the programmable elements and signals that provide the configurability of individual shift register element consistent with aspects of an embodiment of the invention. As illustrated, configurable shift register circuit 25 includes flip-flop 50 and muxes 51, 52, and 53, all coupled as shown. Muxes 51, 52, and 53 are controlled, respectively, by signals CTRL_ADVANCE, CTRL_INIT, and CTRL_LOAD.

Circuit 25 outputs signal SCRM_NEXT at the output of mux 51 and signal LFSR_OUT at the output of flip-flop 50. LFSR_OUT is provided as a "SCRM_CUR" signal of the next shift register circuit in the chain (in this example, shift register circuit 26, not separately shown in detail, but referenced in FIG. 2). In like fashion, the SCRM_CUR signal illustrated in FIG. 5 is provided to the B input of mux 51 and is provided from an "LFSR_OUT" output signal of a prior shift register element circuit (in this example, shift register element circuit 24, not separately shown in detail, but referenced in FIG. 2). Signal "SCRM_SEED" is provided for use when the LFSR circuit of which circuit 25 is a part is to be utilized as an additive scrambler/descrambler as will be further described below.

Use of control signals CTRL_ADVANCE, CTRL_INIT, and CTRL_LOAD to adapt circuit 25 for operation as part of a particular type of scrambler/descrambler is illustrated by the following table:

TABLE I

|  | CTRL_ADVANCE | CTRL_INIT | CTRL_LOAD |
|---|---|---|---|
| Multiplicative Scrambler | B |  | A |
| Multiplicative Descrambler | B |  | A |
| Additive Scrambler | A then B | B | B then A |
| Additive Descrambler | A then B | A or B | B then A |

With reference to FIG. 5 and the above table, to configure circuit 25 as part of an LFSR multiplicative scrambler or descrambler circuit (in this example, circuit 120), signal CTRL_ADVANCE is set to select the B input of mux 51 and signal CTRL_LOAD is set to select the A input of mux 53. In this manner data is passed through the LFSR circuit. Because a multiplicative scrambler scrambles (or descrambles) data without needing an initial seed separate from the data, neither the "SCRM_SEED" nor the "PRESET" input is utilized. In some cases it might be desired to skip certain sets of incoming words (for example, if a particular protocol includes clock compensation words for retiming purposes). In such cases, it might be desirable to temporality set the "CRTL_ADVANCE" signal to select the "A" input so that the scrambler is temporarily bypassed and its state is held and then later reset the signal to select the "B" input when regular data resumes.

To configure circuit 25 as part of an LFSR additive scrambler circuit, the CTRL_ADVANCE signal is set to first select the A input of mux 51. This freezes the state of the circuit so that an initial seed can be loaded. In this example, the initial seed is from the PRESET signal provided at the input of mux 52. This preset value may be provided as a set value in a configuration RAM element or other programmable element. However, in another embodiment, the initial value may be provided by an on-chip state machine and/or sent from another device with which the IC that includes LFSR 120 (and circuit 25) will be communicating. In such an alternative, signal CTRL_INIT may be set to select the A input of mux 52 and the initial seed value will be provided by signal SCRM_SEED. Continuing with this example, for an additive scrambler, signal CTRL_LOAD is initially set to select the B input of mux 53 so that the output of mux 52 can provide the initial scrambling seed to be loaded into flip-flop 50. However, after an initialization event is used to load flip-flop 50, then (on a subsequent clock cycle) signals CTRL_ADVANCE and CTRL_LOAD are changed so that, respectively, the B input of mux 51 and the A input of mux 53 are selected. This enables the operational mode and data can now be loaded into shift register element circuit 25 and scrambled accordingly. If LFSR circuit 120 is to be utilized as an additive descrambler, then control signals are provided in a similar manner except that, in one example, signal CTRL_INIT is set to select the A input of mux 52. Thus the initial seed is provided by the signal SCRM_SEED. In one example, SCRM_SEED is provided by an on-chip state machine. In another example, SCRM_SEED is extracted from a portion of the incoming data stream that is to be descrambled. In an alternative embodiment, if the seed needed for descrambling is known in advance, that seed may be provided as a programmed PRESET signal and the CTRL_INIT signal may be set to select the B input of mux 52 such that PRESET provides the initial descrambling seed. Note that in some embodiments, the PRESET value is stored as a configuration element setting and might be different for different lanes.

Having a mux such as mux 53 in front of each flip-flop in LFSR circuits in each lane also allows switching from a multiplicative scrambler to an additive scrambler when LFSR circuits from multiple lanes are used together (cascade mode). For an additive scrambler, the necessary seed can be loaded into the shift register elements of an LFSR in one of the lanes by selecting the B input of muxes such as mux 53 during a load sequence and then switched to select the A input of those muxes after the seed is loaded and that seed can then propagate throughout the scrambler portions in other lanes.

Figure 6:
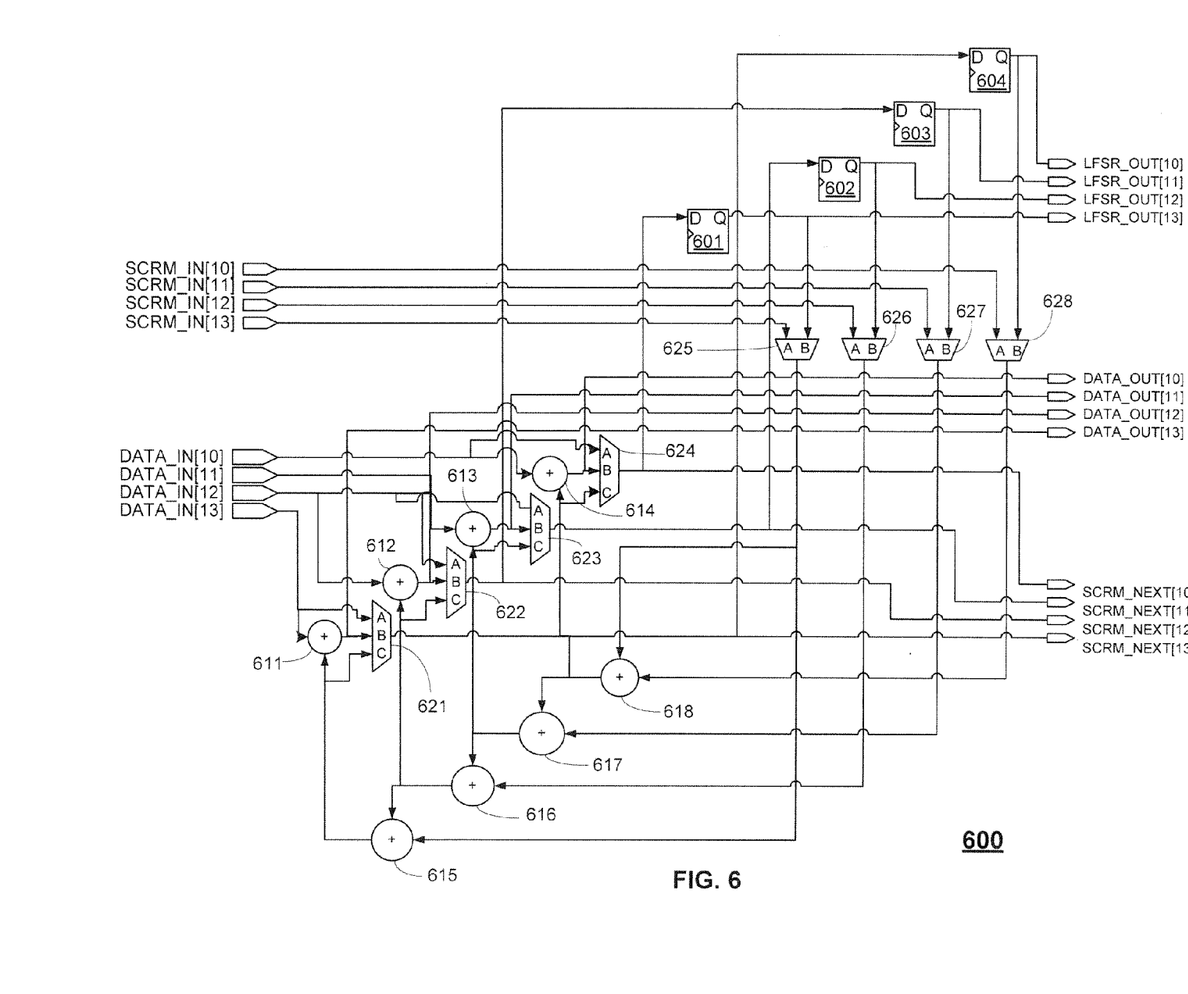
FIG. 6 illustrates scrambling lane circuitry in accordance with an alternative embodiment of the invention adapted for a 4-bit wide data lane.
Figure 7:
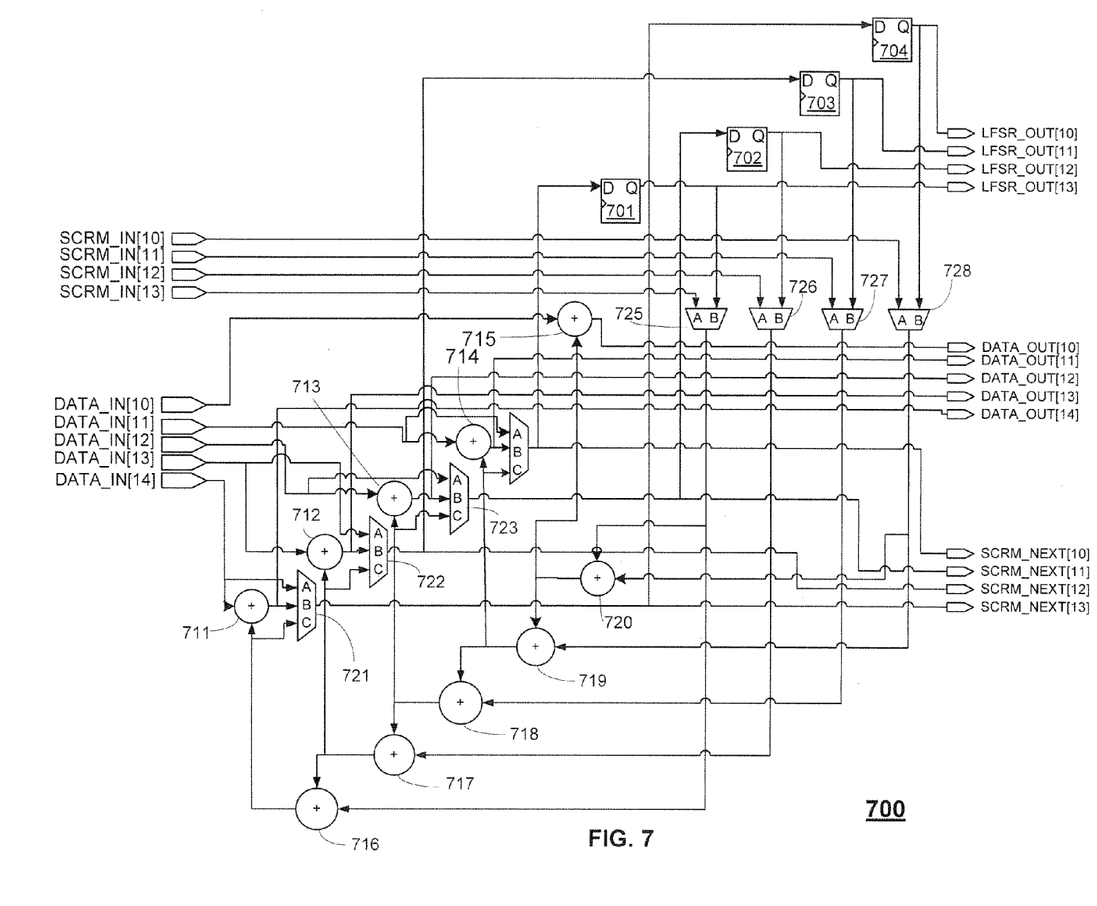
FIG. 7 illustrates scrambling lane circuitry in accordance with an alternative embodiment of the invention adapted for a 5-bit wide data lane.

FIG. 6 illustrates scrambling lane circuitry 600 in according with an alternative embodiment of the invention adapted for a 4-bit wide data lane. Although FIGS. 1, 2, 3, and 5 described embodiments of the invention in the context of examples in which each data lane was assumed to handle data that is a single bit wide, in other examples a given lane might have data that is more than one bit wide. FIGS. 6-7 illustrated examples showing how configurable LFSR circuits can be built for each lane to scramble data that is more than one bit wide per lane.

As illustrated in FIG. 6, LFSR circuit 600 includes 3-input muxes 621, 622, 623, and 624; 2-input muxes 625, 626, 627, and 628; flip-flops 601, 602, 603, and 604; input XOR circuits 611, 612, 613, and 614; and feedback XOR circuits 615, 616, 617, and 618. LFSR circuit 600 receives data input signals DATA_IN[10], DATA_IN[11], DATA_IN[12], and DATA_IN[13] and scrambling input signals SCRM_IN[10], SCRM_IN[11], SCRM_IN[12], and SCRM_IN[13]. The outputs of flip-flops 604, 603, 602, and 601 provide, respectively, signals LFSR_OUT[10], LFSR_OUT[11], LFSR_OUT[12], and LFSR_OUT[13]. The outputs of XOR circuits 614, 613, 612, and 611 provide, respectively, signals DATA_OUT[10], DATA_OUT[11], DATA_OUT[12], and DATA_OUT[13]. The outputs of muxes 624, 623, 622, and 621 provide, respectively, signals SCRM_NEXT[10], SCRM_NEXT[11], SCRM_NEXT[12], and SCRM_NEXT[13].

LFSR circuit 600 is configurable to operate in either cascade or non-cascade mode. If muxes 625, 626, 627, and 628 are configured to select their B inputs, then LFSR circuit 600 operates in non-cascade mode. In this mode, LFSR circuit 600 acts as a stand-alone scrambler for one lane of 4-bit wide data. However, if muxes 625, 626, 627, and 628 are configured to select their A inputs, then LFSR circuit 600 operates in cascade mode. In this mode, LFSR circuit 600 acts together with similar circuits in other lanes to scramble data across multiple lanes. Specifically, in cascade mode, muxes 625, 626, 627, and 628 select as input, respectively signals SCRM_IN[10], SCRM_IN[11], SCRM_IN[12], and SCRM_IN[13]. These signals are the "SCRM_NEXT" signals from the outputs of 3-input muxes in a similar LFSR circuit in another lane (not separately shown).

LFSR circuit 600 is also configurable to operate as a different scrambler "type" in a similar manner to that described in the context of FIG. 2. With reference to FIG. 6, and assuming the scrambler is configured in "non-cascade" mode as described above, if LFSR circuit 600 is to be utilized as a multiplicative scrambler, then muxes 621, 622, 623, and 624 are configured to select their B inputs. When LFSR circuit 600 is to be utilized as a multiplicative descrambler, the muxes 621, 622, 623, and 624 are configured to select their A inputs. When LFSR circuit 600 is to be utilized as an additive scrambler or descrambler, then muxes 621, 622, 623, and 624 are configured to select their C inputs.

FIG. 7 illustrates scrambling lane circuitry in accordance with an alternative embodiment of the invention adapted for a 5-bit wide data lane. FIG. 6 and FIG. 7, taken together, show the structural requirements for scrambling lane circuitry that is more than one bit wide. As illustrated in FIG. 7, LFSR circuit 700 includes 3-input muxes 721, 722, and 723; 2-input muxes 725, 726, 727, and 728; flip-flops 701, 702, 703, and 704; input XOR circuits 711, 712, 713, 714 and 715; and feedback XOR circuits 716, 717, 718, 719, and 720. LFSR circuit 700 receives data input signals DATA_IN[10], DATA_IN[11], DATA_IN[12], DATA_IN[13] and DATA_IN [14] and scrambling input signals SCRM_IN[10], SCRM_IN [11], SCRM_IN[12], and SCRM_IN[13]. The outputs of flip-flops 704, 703, 702, and 701 provide, respectively, signals LFSR_OUT[10], LFSR_OUT[11], LFSR_OUT[12], and LFSR_OUT[13]. The outputs of XOR circuits 715, 714, 713, 712, and 711 provide, respectively, signals DATA_OUT[10], DATA_OUT[11], DATA_OUT[12], DATA_OUT[13], and DATA_OUT[14]. The outputs of muxes circuits 724, 723, 722, and 721 provide, respectively, signals SCRM_NEXT [10], SCRM_NEXT [11], SCRM_NEXT [12], and SCRM_NEXT [13].

As described in the context of LFSR circuit 600 of FIG. 6, LFSR 700 circuit 700 is configurable to operate in either cascade mode or non-cascade mode by configuring muxes 725, 726, 727, and 728 to select their A inputs (for cascade mode) or B inputs (for non-cascade mode). Also, in similar fashion to LFSR 600, LFSR 700 can be configure to operate as a different type of scrambler (additive versus multiplicative, scrambler versus descrambler) by configuring muxes 712, 722, 723, and 724 as described for the comparable muxes in FIG. 6.

FIG. 7 illustrates how a wider data path can be accommodated within a lane-based scrambler. Specifically, the number of flip-flops is the same as in FIG. 6 (four flip-flops) and correlates to the highest exponent in the scrambling polynomial. However, additional data inputs and outputs are accommodated with additional XOR circuits 715 and 720 as shown and the wiring connections are modified accordingly as shown in FIG. 7.

In the examples of FIG. 6 and FIG. 7, the supported polynomial is $x^4+x+1$, a fourth degree polynomial with three terms. However, a larger number of terms in a scrambling polynomial could be supported in alternative embodiments by providing additional 3-input multiplexers (for example, an additional 3-input mux would be provided in front of input XOR circuit 715 if LSFR circuit 700 needed to implement a polynomial with four terms; and, as those skilled in the art would understand, to the extent such a polynomial also has a highest exponent of more than four, the number of flip-flops such as flip-flops 701-704 and associated muxes 725-728 would be expanded accordingly). Following the pattern illustrated in FIGS. 6 and 7, one skilled in the art could provide a configurable LFSR circuit for various data widths.

Figure 8:
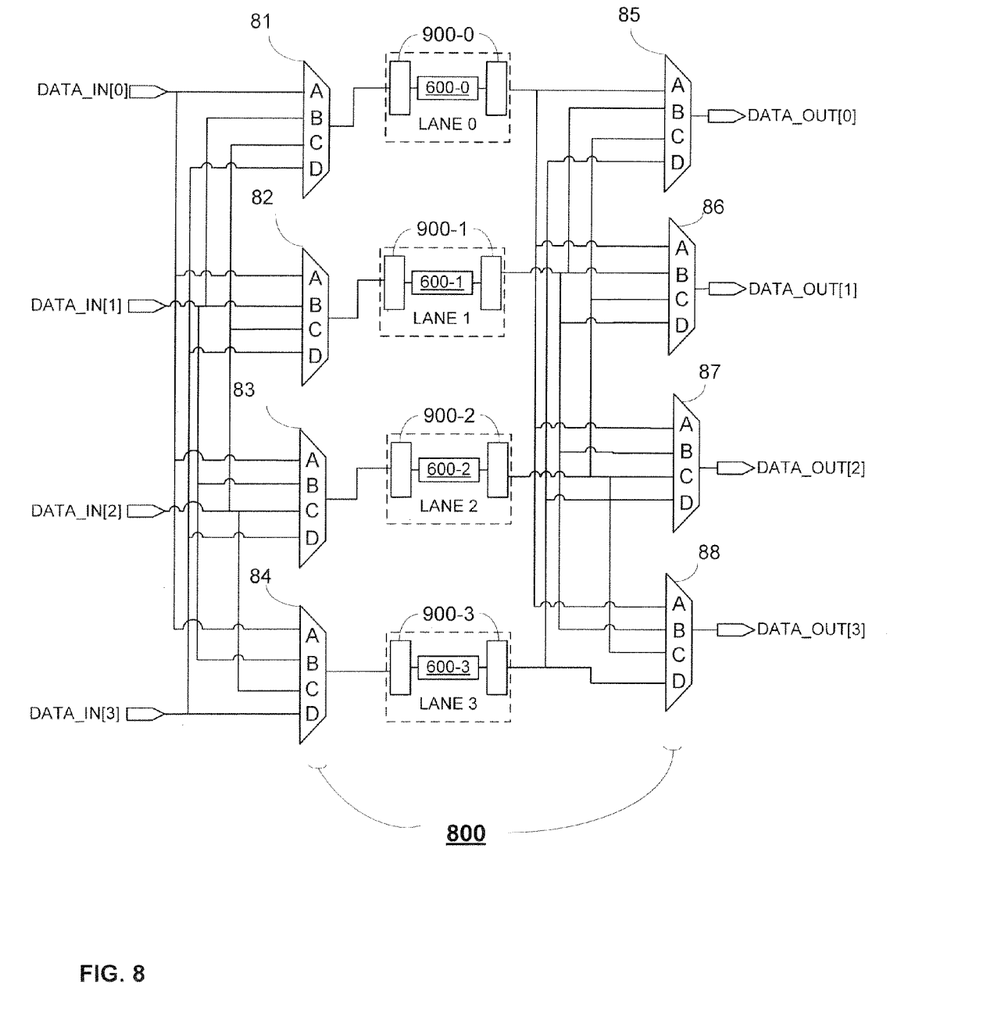
FIG. 8 illustrates circuitry coupled to provide configurability between least significant bit ("LSB") and most significant bit ("MSB") ordering in accordance with an aspect of an embodiment the invention.

FIG. 8 illustrates lane reordering circuitry 800 coupled to provide configurability between least significant bit ("LSB") and most significant bit ("MSB") ordering for any two or more bonded lanes (of the four illustrated lanes) in accordance with an aspect of an embodiment the invention. Specifically, circuitry 800 includes muxes 81, 82, 83, 84, 85, 86, 87, and 88. The respective outputs of muxes 81, 82, 83, and 84 are respectively coupled to respective scrambler circuitry 600-0, 600-1, 600-2, and 600-3 via respective bit reversal circuitry 900-0, 900-1, 900-2, and 900-3 in, respectively, LANE 0, LANE 1, LANE 2, and LANE 3. The scrambler circuitry in each lane is coupled through respective bit reversal circuitry as shown to muxes 85-88 as follows: scrambler 600-0 is coupled (via bit reversal circuitry 900-0) to "A" inputs of muxes 85, 86, 87, 88, and 89; scrambler 600-1 is coupled (via bit reversal circuitry 900-1) to "B" inputs of muxes 85, 86, 87, 88, and 89; scrambler 600-2 is coupled (via bit reversal circuitry 900-2) to "C" inputs of muxes 85, 86, 87, 88, and 89; and scrambler 600-3 is coupled (via bit reversal circuitry 900-3) to "D" inputs of muxes 85, 86, 87, 88, and 89. The A inputs of, respectively, muxes 81, 82, 83, and 84 are coupled to receive input signal DATA_IN[0]. The B inputs of, respectively, muxes 81, 82, 83, and 84 are coupled to receive input signal DATA_IN[1]. The C inputs of, respectively, muxes 81, 82, 83, and 84 are coupled to receive input signal DATA_IN[2]. The D inputs of, respectively, muxes 81, 82, 83, and 84 are coupled to receive input signal DATA_IN[3]. The output of, respectively, muxes 85, 86, 87, and 88 are coupled to provide respective output signals DATA_OUT[0], DATA_OUT[1], DATA_OUT[2], and DATA_OUT[3].

The illustrated arrangement allows any two or more illustrated lanes to be aggregated and to select between LSB and MSB ordering for the aggregated lanes. For example, if all four lanes are aggregated together, then to use circuitry 800 with a protocol using LSB ordering, the circuitry would be configured as follows: muxes 81 and 85 are configured to select their A inputs; muxes 82 and 86 are configured to select their B inputs; muxes 83 and 87 are configured to select their C inputs; and muxes 84 and 88 are configured to select their D inputs. To use circuitry 800 with a protocol requiring MSB ordering (with all four lanes aggregated together), the circuitry would be configured as follows: muxes 81 and 85 are configured to select their D inputs; muxes 82 and 86 are configured to select their C inputs; muxes 83 and 87 are configured to select their B inputs; and muxes 84 and 88 are configured to select their A inputs.

As another example, if just LANE 0, LANE 1, and LANE 2 were aggregated together then, to use circuitry 800 with a protocol using LSB ordering for those lanes, the circuitry would be configured as follows: muxes 81 and 85 are configured to select their A inputs; muxes 82 and 86 are configured to select their B inputs; and muxes 83 and 87 are configured to select their C inputs. To use circuitry 800 with a protocol using MSB ordering for those lanes, the circuitry would be configured as follows: muxes 81 and 85 are configured to select their C inputs; muxes 82 and 86 are configured to select their B inputs; muxes 83 and 87 are configured to select their A inputs.

In some embodiments, A, B, C, and D inputs of each mux receive (and the outputs of each mux transmit) data that is one bit wide. When each lane handles data that is more than one bit wide, then additional bit ordering circuitry 900 will be needed in each lane as further described below in the context of FIG. 9.

It should be noted that if a particular application requires data path width conversion ("gearboxing") to change the width of incoming or outgoing data, it may be necessary to reorder lanes after such gearboxing on a transmit path and before such gearboxing on a receive path and therefore gearboxing would occur between lane reordering and scrambling/descrambling. Thus, although not shown in FIG. 8 to avoid over complicating the drawings, in a particular implementation, gearboxing circuitry might be on a data path between lane reordering circuitry and bit reordering circuitry. For example, on a receive datapath, such gearboxing circuitry would be after muxes 81-84 but before the bit reordering and descrambling circuitry of LANE 0-LANE 3. On a transmit data path, such gearboxing circuitry would be after the scrambling circuitry (and after the bit reordering circuitry) of LANE 0-LANE 3 but before muxes 85-88.

Figure 9:
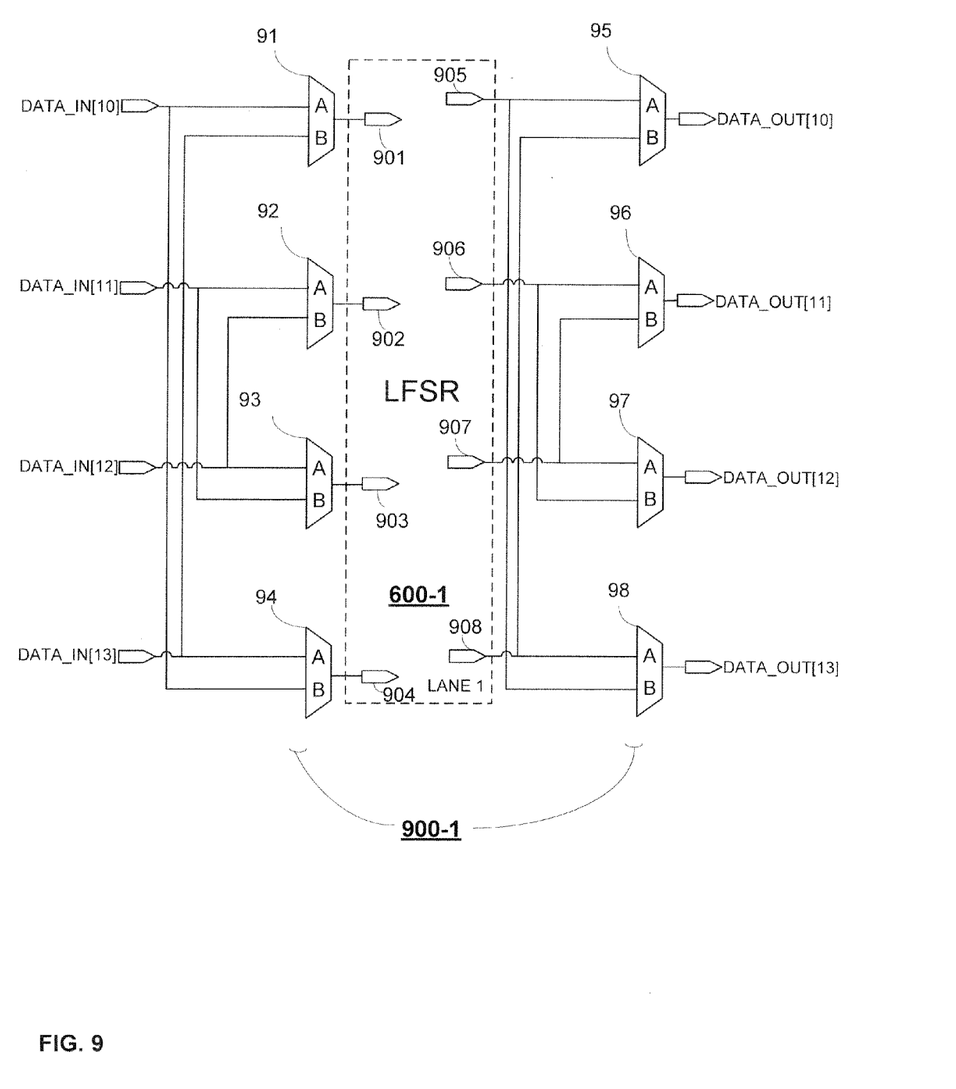
FIG. 9 illustrates MSB/LSB configuration circuitry coupled to an individual lane that is more than one bit wide in accordance with an aspect of an embodiment of the invention.

FIG. 9 illustrates details of the bit reordering circuitry 900 of FIG. 8 for a particular lane. Specifically, FIG. 9 illustrates bit reordering circuitry 900-1 coupled to LFSR 600-1 of FIG. 8 for a LANE 1. Circuitry such as circuitry 900-1 can be used to accomplish bit reversal when data is more than one bit wide per lane. Circuitry 900-1 includes muxes 91, 92, 93, 94, 95, 96, 97, and 98. The outputs of muxes 91, 92, 93, and 94 are respectively coupled to LFSR inputs, respectively, 901, 902, 903, and 904. The LFSR outputs 905, 906, 907, and 908 are respectively coupled to A inputs of, respectively, muxes 95, 96, 97, and 98 and to B inputs of, respectively, muxes 98, 97, 96, and 95. The A inputs of, respectively, muxes 91, 92, 93, and 94 are coupled to receive respective input signals DATA_IN[10], DATA_IN[11], DATA_IN[12], and DATA_IN[13]. The B inputs of, respectively, muxes 94, 93, 92, and 91 are also coupled to receive respective input signals DATA_IN[10], DATA_IN[11], DATA_IN[12], and DATA_IN[13]. The output of, respectively, muxes 95, 96, 97, and 98 are coupled to provide respective output signals DATA_OUT[10], DATA_OUT[11], DATA_OUT[12], and DATA_OUT[13].

If circuitry 900-1 is to be used with a protocol using LSB ordering, then muxes 91-98 are all configured to select their A inputs. If circuitry 900 is to be used with a protocol using MSB ordering, then muxes 91-98 are all configured to select their B inputs. In a typical application, the selected ordering (LSB or MSB) is done on the transmit side at the bit level and then distributed ("striped") across lanes. Therefore, the settings for circuitry 800 in FIG. 8 and circuitry 900-1 in FIG. 9 are typically related.

Scrambler 100 in FIG. 1 (or, scramblers in accordance with alternative embodiments of the invention), may be provided as part of a transceiver in any IC that supports transceiver configuration. Such configuration may be accomplished via data stored in programmable elements on the IC. Programmable elements may include dynamic or static RAM, flip-flops, electronically erasable programmable read-only memory (EEPROM) cells, flash, fuse, anti-fuse programmable connections, or other memory elements. Transceiver configuration may also be accomplished via one or more externally generated signals received by the IC during operation of the IC. Data represented by such signals may or may not be stored on the IC during operation of the IC. Transceiver configuration may also be accomplished via mask programming during fabrication of the IC. While mask programming may have disadvantages relative to some of the field programmable options already listed, it may be useful in certain high volume applications.

A specific example of an IC that supports transceiver configuration is a PLD. PLDs (also referred to as complex PLDs, programmable array logic, programmable logic arrays, field PLAs, erasable PLDs, electrically erasable PLDs, logic cell arrays, field programmable gate arrays, or by other names) provide the advantages of fixed ICs with the flexibility of custom ICs. PLDs have configuration elements (i.e., programmable elements) that may be programmed or reprogrammed. Placing new data into the configuration elements programs or reprograms the PLD's logic functions and associated routing pathways.

Figure 10:
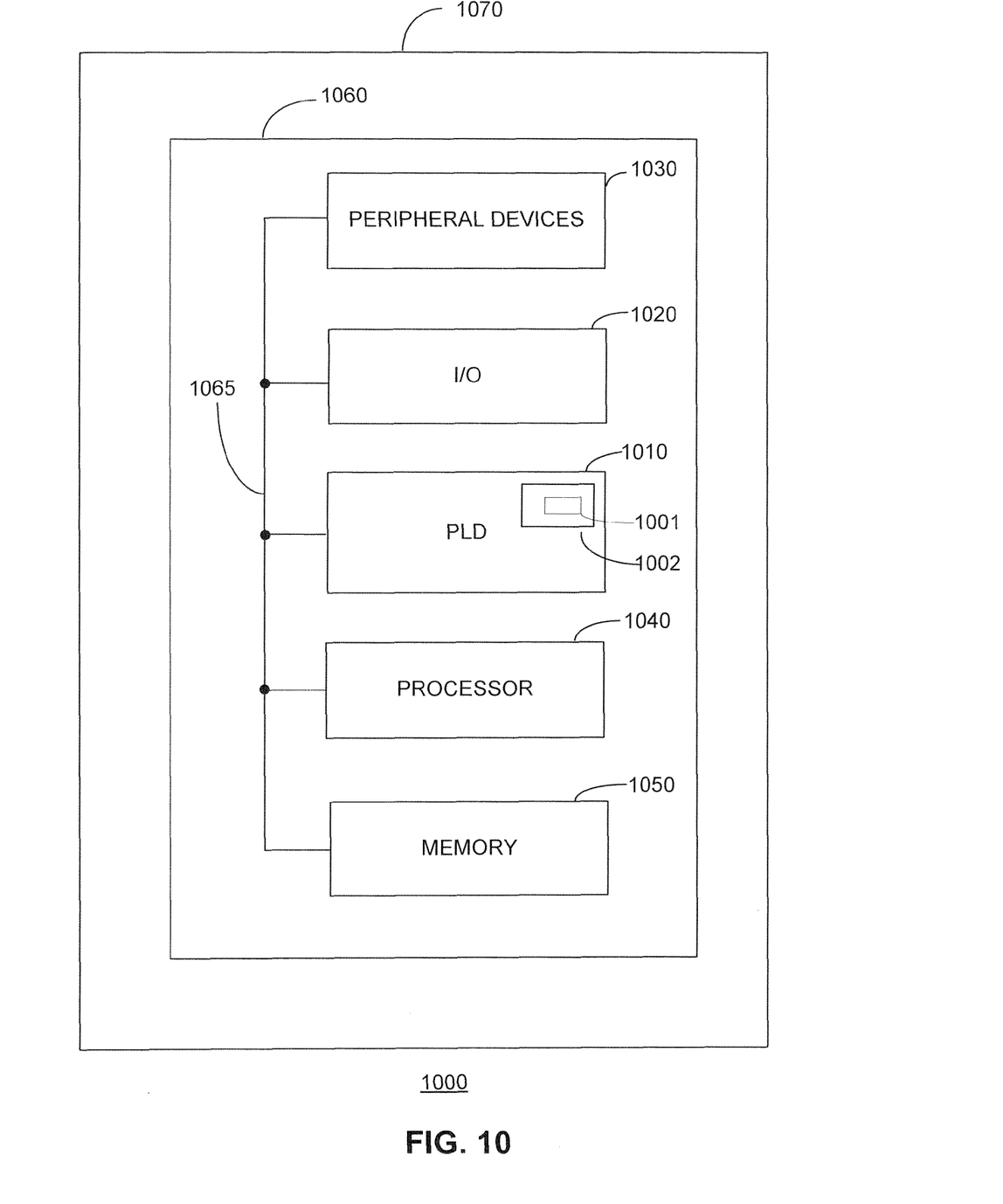
FIG. 10 illustrates an exemplary data processing system including a transceiver with a configurable scrambler in accordance with an embodiment of the invention.

FIG. 10 illustrates an exemplary data processing system 1000 including PLD 1001. PLD 1001 includes transceiver 1002 which includes a scrambler 1001; scrambler 1001 is in accordance with an embodiment of the invention. For ease of illustration, only a single transceiver is shown; however, a PLD such as PLD 1001 may include multiple transceivers such as transceiver 1002.

Data processing system 1000 may include one or more of the following additional components: processor 1040, memory 1050, input/output (I/O) circuitry 1020, and peripheral devices 1030 and/or other components. These components are coupled together by system bus 1065 and are populated on circuit board 1060 which is contained in end-user system 1070. A data processing system such as system 1000 may include a single end-user system such as end-user system 1070 or may include a plurality of systems working together as a data processing system.

System 1000 can be used in a wide variety of applications, such as computer networking, data networking, instrumentation, video processing, digital signal processing, or any other application where the advantage of using programmable or reprogrammable logic in system design is desirable. PLD 1001 can be used to perform a variety of different logic functions. For example, PLD 1001 can be configured as a processor or controller that works in cooperation with processor 1040 (or, in alternative embodiments, a PLD might itself act as the sole system processor). PLD 1001 may also be used as an arbiter for arbitrating access to shared resources in system 1000. In yet another example, PLD 1001 can be configured as an interface between processor 1040 and one of the other components in system 1000. It should be noted that system 1000 is only exemplary.

In one embodiment, system 1000 is a digital system. As used herein a digital system is not intended to be limited to a purely digital system, but also encompasses hybrid systems that include both digital and analog subsystems.

ADDITIONAL EMBODIMENTS

A first additional embodiment provides a scrambler configurable to be either an additive or a multiplicative scrambler. In some variations of the first additional embodiment, the scrambler includes a data input, a first selection circuit, an input XOR circuit, a plurality of shift register elements coupled together, and one or more feedback XOR circuits coupled to two or more of the plurality of shift register elements; wherein: the data input is coupled to an input of the input XOR circuit and to a first input of the first selection circuit; an output of the input XOR circuit is coupled to a second input of the first selection circuit; two of the shift register elements are coupled to inputs of the feedback XOR circuits which are in turn coupled to the input XOR circuit and to a third input of the first selection circuit and further wherein: configuring the first selection circuit to select its first input adapts the scrambler for operation as a multiplicative descrambler; configuring the first selection circuit to select its second input adapts the scrambler for operation as a multiplicative scrambler; and configuring the first selection circuit to select its third input adapts the scrambler to operate as an additive scrambler or descrambler. In some variations, the feedback XOR circuit includes a plurality of XOR circuits arranged in a tree, the feedback XOR circuit tree being coupled to more than two of the shift register elements. In some embodiments, a scrambling seed for an additive scrambler may be pre-programmed into configuration elements coupled to configurable circuits for loading individual shift register elements. In other embodiments, the scrambling seed may be provided through a data input as an initial part of a data stream. In some embodiments, selection circuits coupled to each shift register element in the configurable LFSR circuit may be controlled to first load a scrambling seed and then evolve data in an operational mode to provide scrambled data. In some embodiments, the scrambling seed value for a particular shift register element may be provided from a selected one of multiple input sources.

A second additional embodiment provides a scrambler configurable to support any one of a plurality of scrambling polynomials. Some variations of the second additional embodiment include a plurality of programmable taps coupled to outputs of shift register elements in an LFSR circuit. Outputs of the programmable taps are coupled to a feedback XOR circuit tree. In one variation, the programmable taps comprise AND gates with one input of the AND gate being coupled to an output of a shift register element and another input being coupled to a configuration element. In one variation, the number of individual XOR circuits in the XOR circuit tree and/or the number of programmable taps is streamlined such that only the outputs of shift register elements whose place in the LFSR circuit correspond to exponent values appearing in potentially supported scrambling polynomials are coupled to the XOR circuit tree. In one aspect, the configurable scrambler may be programmed for supporting a particular polynomial by programming "1" in each configuration element that is coupled to an AND gate input for AND gates coupling shift register elements whose place in the LFSR circuit correspond to exponent values of terms in the selected scrambling polynomial for which the scrambler is to be configured.

A third additional embodiment includes a method for providing a streamlined multi-protocol LFSR circuit. The method includes providing a number of shift register elements corresponding to the largest exponent value of any term in a scrambling polynomial to be supported; providing programmable taps coupling the output of each $i^{th}$ shift register element—where "i" corresponds to an exponent value of a term in a supported scrambling polynomial—to a XOR circuit in a XOR circuit tree; providing a number of XOR circuits in the XOR circuit tree equal to one less than the number of shift register elements with output coupled (via the programmable taps) to the XOR circuit tree.

While the invention has been particularly described with respect to the illustrated embodiments, it will be appreciated that various alterations, modifications and adaptations may be made based on the present disclosure, and are intended to be within the scope of the invention. While the invention has been described in connection with what are presently considered to be the most practical and preferred embodiments, it is to be understood that the invention is not limited to the disclosed embodiments but only by the following claims.

What is claimed is:

1. A configurable scrambler in an integrated circuit ("IC") comprising:
   a plurality of linear feedback shift register ("LFSR") circuits, each coupled to receive data in one of a plurality of data lanes; and
   selection circuits coupled between the LFSR circuits, the selection circuits being configurable to select between two modes of the configurable scrambler, the two modes including: a first mode in which each of the plurality of LFSR circuits scramble data in a corresponding lane separately and a second mode in which two or more of the LFSR circuits are combined to scramble data in two or more of the plurality of the lanes, wherein combining the LFSR circuits includes providing a scramble output of a first LFSR circuit to a scramble input of a second LFSR circuit, the first LFSR circuit being coupled to one of the plurality of lanes and the second LFSR circuit being coupled to another of the plurality of lanes.

2. The configurable scrambler of claim 1 wherein:
   an LFSR circuit includes a data input, a scramble input, a feedback output, a data output, and a scramble output; and
   the selection circuits include output selection circuits and feedback selection circuits, a first output selection circuit arranged to provide output to a first feedback selection circuit and to another output selection circuit and being configurable to select input from either a feedback output of a first LFSR circuit or from another output selection circuit, the first feedback selection circuit providing output to a scramble input of the first LFSR circuit and being configurable to select input from either a scramble output of a second LFSR circuit or from the first output selection circuit.

3. The configurable scrambler of claim 2 wherein a second feedback selection circuit is coupled to provide output to a first shift register element of an LFSR circuit and is configurable to select input from either the first feedback selection or from an input selection circuit.

4. The configurable scrambler of claim 3 wherein the input selection circuit is configurable to select input from a feedback XOR circuit tree of the LFSR circuit, an input XOR circuit of the LFSR circuit or a data input of the LFSR circuit.

5. The configurable scrambler of claim 4 wherein configuration of the input selection circuit to select input from the XOR circuit tree adapts the LFSR circuit for operation as an additive scrambler or descrambler circuit.

6. The configurable scrambler of claim 4 wherein configuration of the input selection circuit to select input from the input XOR circuit of the LFSR circuit adapts the LFSR circuit for operation as a multiplicative scrambler circuit.

7. The configurable scrambler of claim 5 wherein configuration of the input selection circuit to select input from the data input of the LFSR circuit adapts the LFSR circuit for operation as a multiplicative descrambler circuit.

8. A scrambler comprising:
   a plurality of linear feedback shift register ("LFSR") circuits, each coupled to receive data in one of a plurality of data lanes;
   a first plurality of selection circuits, a selection circuit of the first plurality of selection circuits being coupled to provide output to an LFSR circuit in one of the plurality of lanes by selecting input from one of at least two data input signals, a first data input signal of the at least two data input signals being from a first data lane of the plurality of data lanes and a second data input signal of the at least two data input signals being from a second data lane of the plurality of data lanes; and a second plurality of selection circuits, each coupled to provide output by selecting input from output of one of at least two of the plurality of LFSR circuits.

9. The scrambler of claim 8 wherein:

the first plurality of selection circuits are coupled to receive input signals from a data lane and provide output signals to the plurality of LFSR circuits such that an ordering of data from a first lane to a last lane can be provided to LFSR circuits in the first lane to the last lane in either a most significant bit ("MSB") order or a least significant bit ("LSB") order depending on a configuration of the first plurality of selection circuits; and the second plurality of selection circuits are coupled to receive input signals from the plurality of LFSR circuits and to provide output signals such that an ordering of data output by the LFSR circuits from a first lane to a last lane can be provided in the first lane to the last lane in either an MSB order or an LSB order depending on a configuration of the second plurality of selection circuits.

10. The scrambler of claim 8 wherein;

each of the at least two input signals received by a selection circuit of the first plurality of selection circuits and the output provided by that selection circuit to an LFSR circuit is more than one bit wide ("multi-bit wide"); and the input selected from output of an LFSR circuit by a selection circuit of the second plurality of selection circuits and the output provided by that selection circuit is multi-bit wide.

11. The scrambler of claim 10 further comprising:

for each LFSR circuit, a third plurality of selection circuits coupled between the selection circuit of the first plurality of selection circuits and the LFSR circuit, each selection circuit of the third plurality of selection circuits being configurable to select one-bit wide output from the multi-bit wide output provided by the selection circuit of the first plurality of selection circuits and provide the selected one-bit wide output to an input of the LFSR circuit; and for each LFSR circuit, a fourth plurality selection circuits coupled between the LFSR circuit and the selection circuit of the second plurality of selection circuits, each selection circuit of the fourth plurality of selection circuits being configurable to select one-bit wide output from the multi-bit wide output provided by the LFSR circuit and provide that output to an input of the selection circuit of the second plurality of selection circuits.

12. The scrambler of claim 11 wherein the third plurality of selection circuits are coupled to receive input signals from the selection circuit of the first plurality of selection circuits and provide selected output to the LFSR circuit such that an ordering of data within a lane of the LFSR circuit can be provided to the LFSR circuit in either an MSB order or an LSB order depending on a configuration of the third plurality of selection circuits; and the fourth plurality of selection circuits are coupled to receive input signals from output of the LFSR circuit and to provide output to the selection circuit of the second plurality of selection circuits such that an ordering of data output by the LFSR circuit can be provided to the selection circuit of the second plurality of selection circuits in either an MSB order or an LSB order depending on a configuration of the fourth plurality of selection circuits.

13. A programmable logic device comprising the scrambler of claim 1.

14. A programmable logic device comprising the scrambler of claim 8.

15. A data processing system comprising the programmable logic device of claim 13.

16. A data processing system comprising the programmable logic device of claim 14.

17. A method of selectively aggregating data lanes to be scrambled, the method comprising:

determining which of a plurality of data lanes are to be combined for scrambling; and for lanes that are to be combined, providing a scramble output of a first linear feedback shift register ("LFSR") circuit to a scramble input of a second LFSR circuit, the first LFSR circuit being coupled to one of the plurality of lanes and the second LFSR circuit being coupled to another of the plurality of lanes.

18. The method of claim 17 further comprising:

for lanes not to be combined, providing LFSR output of an LFSR circuit in a first lane to a scramble input of the LFSR circuit in the first lane.

19. The method of claim 17 further comprising:

for lanes that are to be combined, selecting between least significant bit ordering and most significant bit ordering; and ordering data from one lane to another according to the selection.

20. The method of claim 19 wherein each lane is adapted to process data that is more than one bit wide ("multi-bit wide data"), the method further comprising:

selecting between least significant bit ordering and most significant bit ordering for data within each lane; and ordering data within each lane according to the selection.

\* \* \* \* \*